(12) United States Patent
Wakou et al.

(10) Patent No.: US 9,194,356 B2
(45) Date of Patent: Nov. 24, 2015

(54) STOP CONTROL SYSTEM FOR INTERNAL COMBUSTION ENGINE

(75) Inventors: Shinichirou Wakou, Saitama-ken (JP);
Yoshihisa Tsuchiya, Saitama-ken (JP);
Shinji Yasuno, Saitama-ken (JP);
Masanobu Eguchi, Saitama-ken (JP);
Kanao Kogure, Saitama-ken (JP);
Nobuyuki Akahoshi, Saitama-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 478 days.

(21) Appl. No.: 13/421,167

(22) Filed: Mar. 15, 2012

(65) Prior Publication Data
US 2012/0259530 A1    Oct. 11, 2012

(30) Foreign Application Priority Data

Apr. 7, 2011    (JP) .................................. 2011-085430

(51) Int. Cl.
*F02N 11/08* (2006.01)
*B60H 1/00* (2006.01)

(52) U.S. Cl.
CPC .......... *F02N 11/084* (2013.01); *B60H 1/00778* (2013.01); *F02N 2200/0806* (2013.01); *Y02T 10/48* (2013.01)

(58) Field of Classification Search
CPC . F02N 11/08; F02N 11/0803; F02N 11/0811; F02N 11/0814; F02N 11/0818; F02N 11/0833; F02N 11/084
USPC ............ 701/113; 123/179.3, 179.4; 290/38 C
See application file for complete search history.

(56) References Cited

U.S. PATENT DOCUMENTS

| | | | |
|---|---|---|---|
| 2004/0055305 A1* | 3/2004 | Kuroda et al. | 60/698 |
| 2004/0149246 A1* | 8/2004 | Itoh et al. | 123/179.4 |
| 2004/0211381 A1* | 10/2004 | Ogawa et al. | 123/179.4 |
| 2007/0107455 A1* | 5/2007 | Deiml et al. | 62/323.1 |
| 2008/0201064 A1* | 8/2008 | DiGonis | 701/110 |

(Continued)

FOREIGN PATENT DOCUMENTS

| | | |
|---|---|---|
| JP | 2009-138708 | 6/2009 |
| JP | 2009-138709 A | 6/2009 |
| JP | 2010-30549 A | 2/2010 |

(Continued)

OTHER PUBLICATIONS

JP Office Action 2011-085430.

*Primary Examiner* — Erick Solis
*Assistant Examiner* — Anthony L Bacon
(74) *Attorney, Agent, or Firm* — Mori & Ward, LLP

(57) ABSTRACT

A stop control system for an internal combustion engine, which is capable of ensuring the comfort of vehicle occupants in a vehicle compartment and improving the fuel economy of the engine along with automatic stoppage of the engine during both a cooling operation and a heating operation of an air conditioner. When the engine is automatically stopped, the stop control system sets a target blowout temperature which is a target value of the temperature of air blown out from the air conditioner into a vehicle compartment, and acquires a fan voltage indicative of the air volume blown by a fan of the air conditioner. Further, the stop control system calculates stop allowable time based on the target blowout temperature and the fan voltage, and restarts the engine when engine stoppage time period (stoppage time period-counting timer value) has reached the stop allowable time.

8 Claims, 5 Drawing Sheets

(56) References Cited

U.S. PATENT DOCUMENTS

2009/0145141 A1* 6/2009 Akahoshi et al. ............... 62/133
2012/0215430 A1* 8/2012 Watanabe et al. ............. 701/113

FOREIGN PATENT DOCUMENTS

| JP | 4475437 B2 | 3/2010 |
|----|------------|--------|
| JP | 2010-100144 A | 5/2010 |

* cited by examiner

F I G. 6

| TA0\VFAN | VFAN1 | ········ | VFANn |
|---|---|---|---|
| TA01 | TADMSTP11 | ········ | TADMSTP1n |
| ⋮ | ⋮ | | ⋮ |
| TA0m | TADMSTPm1 | ········ | TADMSTPmn |

STOP CONTROL SYSTEM FOR INTERNAL COMBUSTION ENGINE

BACKGROUND OF THE INVENTION

1. Field of the Invention

The present invention relates to a stop control system for an internal combustion engine, which automatically stops and restarts the engine installed on a vehicle.

2. Description of the Related Art

Conventionally, as a stop control system for an internal combustion engine of this kind, one disclosed in Japanese Patent No. 4475437 is known. To improve fuel economy, the engine is automatically stopped during stoppage of a vehicle when predetermined stop conditions (idle stop conditions) are satisfied. Further, the engine is used as a drive source of a compressor of an air conditioner. This can cause the following inconveniences when the engine is stopped during a cooling operation of the air conditioner.

After stoppage of the engine, although the blowing of air into a vehicle compartment by an electric blower is continued, the circulation of refrigerant is stopped along with stoppage of a compressor, whereby the temperature of an evaporator starts to rise. Since air having passed through the evaporator is blown out into the vehicle compartment, the temperature of the air progressively rises as the temperature of the evaporator rises. This makes it impossible to maintain sufficient cooling performance of the air conditioner.

Therefore, in the stop control system disclosed in Japanese Patent No. 4475437, after the engine is automatically stopped, when a predetermined engine stoppage time period has elapsed, the engine is restarted. The engine stoppage time period is set in the following manner: First, an upper limit temperature of the evaporator of the air conditioner below which it is possible maintain the comfort of vehicle occupants in the vehicle compartment (hereafter referred to as the "allowable upper limit temperature") is calculated according to the settings of the air conditioner and the external environment. Then, a time period over which the comfort of vehicle occupants in the vehicle compartment can be maintained (hereafter referred to as the "compartment temperature rise allowable time") is calculated based on the difference between the calculated allowable upper limit temperature and the temperature of the evaporator detected immediately before the stoppage of the engine. Furthermore, the engine stoppage time period is set based on the calculated compartment temperature rise allowable time.

Engine coolant of the engine is used as a heat source of the air conditioner. When the engine is stopped during a heating operation of the air conditioner, the engine coolant of the engine starts to be lowered along therewith. This lowers the temperature of a heater, whereby the temperature of air blown out into the vehicle compartment via the heater is progressively lowered, thereby making it impossible to maintain sufficient heating performance of the air conditioner.

On the other hand, in the conventional stop control system described above, the engine stoppage time period for defining start timing of the restart of the engine is set in order to maintain the comfort of vehicle occupants in the vehicle compartment during a cooling operation of the air conditioner, but this setting of the engine stoppage time period is merely performed based on the temperature of the evaporator, irrespective of the temperature condition of the heater. Therefore, the engine is sometimes not restarted although the temperature of the heater is largely lowered. In such a case, the temperature of air blown out into the vehicle compartment cannot be maintained to be high, which results in the degraded comfort of vehicle occupants in the vehicle compartment provided by a heating operation of the air conditioner. Inversely, the engine is sometimes restarted quickly although the temperature of the heater is not so lowered, which degrades fuel economy of the engine.

SUMMARY OF THE INVENTION

It is an object of the present invention to provide a stop control system for an internal combustion engine, which is capable of ensuring the comfort of vehicle occupants in a vehicle compartment and improving the fuel economy of the engine along with automatic stoppage of the engine, during both a cooling operation and a heating operation of an air conditioner.

To attain the above object, the present invention provides a stop control system for an internal combustion engine that is installed on a vehicle and is used as a drive source of a compressor for compressing refrigerant of an air conditioner and supplying the refrigerant to an evaporator, and as a heat source of the air conditioner, the stop control system stopping the engine when predetermined stop conditions are satisfied and restarting the engine when predetermined restart conditions are satisfied, comprising target blowout temperature-setting means for setting a target blowout temperature which is a target value of a temperature of air blown out from the air conditioner into a vehicle compartment when the engine is stopped, air volume parameter acquisition means for acquiring an air volume parameter indicative of an air volume blown by a fan of the air conditioner when the engine is stopped, and restart means for calculating a stop allowable time period based on the set target blowout temperature and the acquired air volume parameter, and restarting the engine when a stoppage time period during which the engine remains stopped has reached the stop allowable time period.

This engine is installed on a vehicle and is used as the drive source of the compressor of the air conditioner and the heat source of the air conditioner. During an operation of the engine, when the air conditioner is performing a cooling operation, refrigerant which has been compressed by the compressor driven by the engine is supplied to the evaporator, and air cooled by heat exchange with the evaporator is blown out into the vehicle compartment, whereby the vehicle compartment is cooled. Further, during an operation of the engine, when the air conditioner is performing a heating operation, a heater is operated, and air heated by heat exchange with the heater is blown out into the vehicle compartment, whereby the vehicle compartment is heated.

According to the above-described stop control system, the target blowout temperature-setting means sets the target blowout temperature which is the target value of the temperature of the air blown out from the air conditioner into the vehicle compartment (hereafter referred to as the "blowout temperature"), and the air volume parameter acquisition means acquires the air volume parameter indicative of the air volume blown by the fan of the air conditioner. Further, the restart means calculates the stop allowable time period based on the set target blowout temperature and the acquired air volume parameter. When the engine stoppage time period has reached the stop allowable time period, the engine is restarted. This drives the compressor or the heater of the air conditioner, to thereby resume cooling or heating the vehicle compartment.

As the air volume blown by the fan of the air conditioner is larger during stoppage of the engine, the heat exchange with the evaporator is promoted during the cooling operation of the air conditioner, and heat (heat for cooling) having been accumulated in the evaporator during operation of the engine is used up in a shorter time period, so that the blowout temperature of air blown out into the vehicle compartment rises more quickly. Further, during the heating operation of the air conditioner, the heat exchange with the heater is promoted, and heat (heat for heating) having been accumulated in the heater during operation of the engine is used up in a shorter time period, so that the blowout temperature of air blown out into the vehicle compartment lowers more quickly.

As described above, according to the present invention, the stop allowable time period for defining start timing of the restart of the engine is calculated according not only to the target blowout temperature which is the target value of the blowout temperature of air blown out from the air conditioner into the vehicle compartment but also to the air volume parameter indicative of the air volume blown by the fan. Therefore, during stoppage of the engine, it is possible to start the restart of the engine in appropriate timing while ensuring a blowout temperature appropriate to the target blowout temperature and maintaining the temperature of the vehicle compartment. This makes it possible to ensure the comfort of vehicle occupants in the vehicle compartment and improve the fuel economy of the engine during both the cooling operation and the heating operation of the air conditioner.

The above and other objects, features, and advantages of the present invention will become more apparent from the following detailed description taken in conjunction with the accompanying drawings.

BRIEF DESCRIPTION OF THE DRAWINGS

FIG. 6 is a diagram showing an example of a map for use in calculating a stop allowable time period.

DETAILED DESCRIPTION OF PREFERRED EMBODIMENTS

Figure 1:
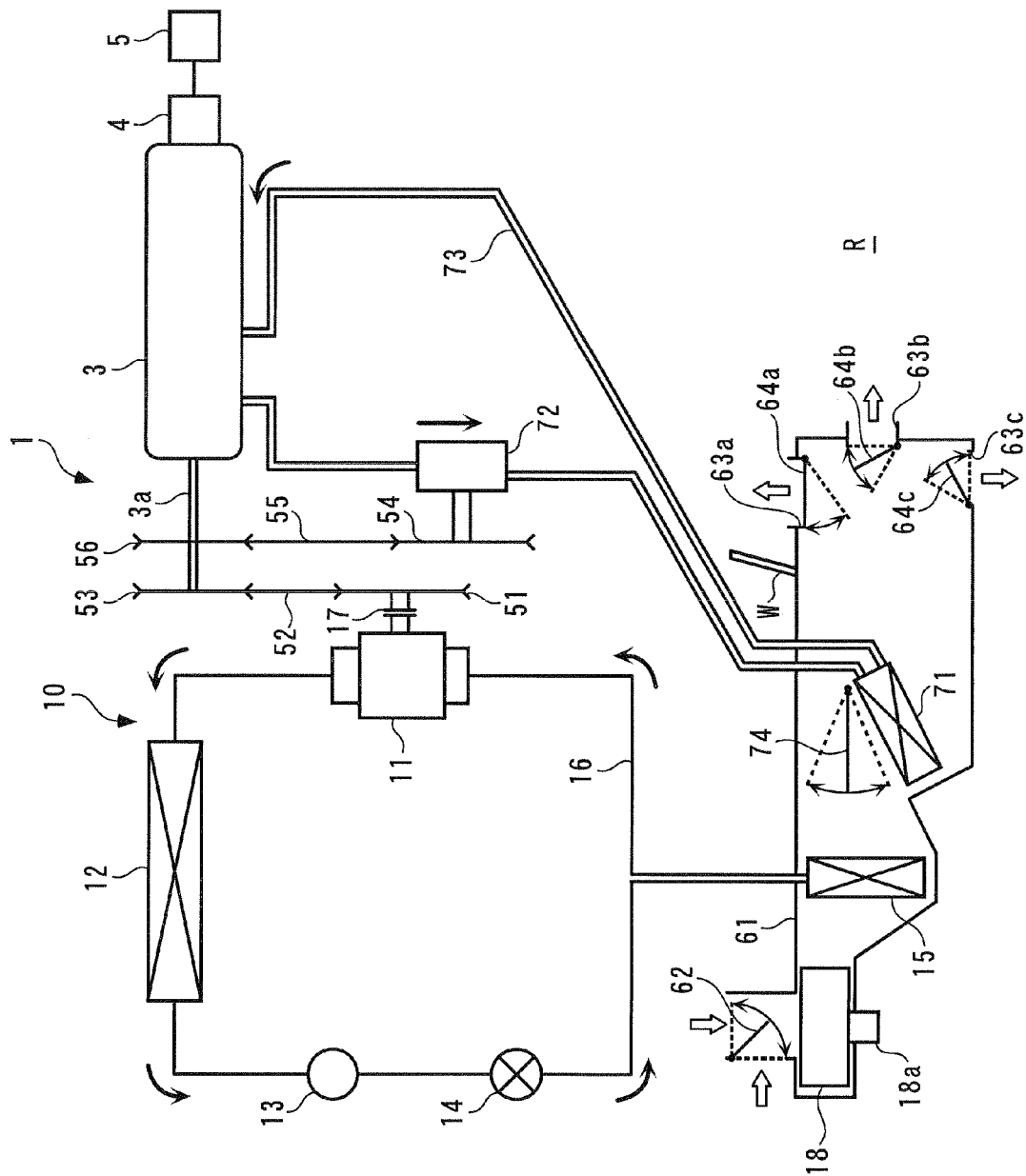
FIG. 1 is a schematic view of an internal combustion engine to which a stop control system according to an embodiment of the present invention is applied.

The invention will now be described in detail with reference to drawings showing a preferred embodiment thereof. FIG. 1 schematically shows a stop control system 1 according to the present embodiment, together with an internal combustion engine (hereafter referred to as the "engine") 3 to which is applied the stop control system 1. The engine 3 is a gasoline engine installed on a vehicle (not shown).

An air conditioner 10 for cooling and heating a vehicle compartment R is mounted on the vehicle. The refrigeration cycle of this air conditioner 10 comprises a compressor 11, a condenser 12, a receiver 13, an expansion valve 14, an evaporator 15, and so forth.

The compressor 11 is connected to a crankshaft 3a of the engine 3 via an electromagnetic air conditioner clutch 17, a pulley 51, a belt 52, and a pulley 53. In a state having the air conditioner clutch 17 connected thereto, the compressor 11 is driven by the crankshaft 3a, and compresses low-temperature low-pressure gaseous refrigerant, for sending the same to the condenser 12 as high-temperature high-pressure gaseous refrigerant via a refrigerant pipe 16.

The compressor 11 is of a variable displacement type, and includes an electromagnetic control valve (not shown) for changing a capacity thereof. The capacity of the compressor 11 is controlled by a drive signal delivered from an ECU 2 to the electromagnetic control valve.

The engagement and disengagement of the above-described air conditioner clutch 17 is controlled by a control signal from the ECU 2 e.g. according to the operating state of an air conditioner switch 41 provided for a driver's seat of the vehicle compartment R. Specifically, when the air conditioner switch 41 is off, the air conditioner clutch 17 is disengaged, whereby a cooling operation of the air conditioner 10 is stopped. On the other hand, when the air conditioner switch 41 is on, the air conditioner clutch 17 is controlled according to a target blowout temperature TAO set as described hereinafter.

The condenser 12 cools and liquefies the high-temperature high-pressure gaseous refrigerant sent from the compressor 11. The liquefied refrigerant is sent to the receiver 13 via the refrigerant pipe 16. The receiver 13 is for temporarily storing the refrigerant. Refrigerant having flowed out from the receiver 13 has moisture removed therefrom by a dryer (not shown), and then is sent to the expansion valve 14. The expansion valve 14 expands the refrigerant in an atomized state and sends the same to the evaporator 15 via the refrigerant pipe 16.

The evaporator 15 is disposed within an air conditioner casing 61 communicating with the vehicle compartment R. The temperature of the atomized refrigerant sent from the expansion valve 14 to the evaporator 15 is raised by heat exchange with air within the air conditioner casing 61, and the refrigerant is evaporated (vaporized). The vaporized refrigerant is returned to the compressor 11 via the refrigerant pipe 16.

The air within the air conditioner casing 61 is cooled by heat exchange with the refrigerant within the evaporator 15, and then is blown out from blowout ports 63a to 63c into the vehicle compartment R by a fan 18 disposed at the inlet of the air conditioner casing 61, whereby the vehicle compartment R is cooled. Further, the air within the air conditioner casing 61 is cooled by the evaporator 15 to condense moisture therein into water, and the dried air is sent into the vehicle compartment R to thereby dehumidify the vehicle compartment R.

The above-described fan 18 includes an electric motor 18a. The air volume blown by the fan 18 is controlled by changing a driving voltage VFAN of the motor 18a (hereafter referred to as the "fan voltage VFAN") using a control signal from the ECU 2. Further, the blowout ports 63a to 63c are provided with a differential door 64a, a vent door 64b, and a floor door 64c, which are pivotally movable and are operated for opening and closing the blowout ports 63a to 63c, respectively. The degree of opening of the differential door 64a is changed by a blowout switch (not shown) provided for the driver's seat, for switching the blowout of air. The degrees of opening of the vent door 64b and the floor door 64c are controlled by control signals from the ECU 2.

A heater core 71 is disposed in the air conditioner casing 61 at a location downstream of the evaporator 15. The heater core 71 is supplied with high-temperature engine coolant having cooled the engine 3, via a circulation path 73 by a water pump 72, whereby the temperature of the heater core 71 is raised. The water pump 72 is connected to the crankshaft 3a via a pulley 54, a belt 55, and a pulley 56, and is always driven by the crankshaft 3a during operation of the engine 3. Air within the air conditioner casing 61, after being heated by the heater core 71, is blown out from the blowout ports 63a to 63c into the vehicle compartment R by the fan 18, whereby the vehicle compartment R is heated.

Further, a pivotally-movable air mix door 74 is disposed within the air conditioner casing 61 at a location immediately upstream of the heater core 71. The degree of opening of the air mix door 74 is controlled by a control signal from the ECU 2. This changes a ratio between the amount of cooled air from the evaporator 15 and the amount of air introduced into and heated by the heater core 71, to thereby adjust the temperature of air blown out from the blowout ports 63a to 63c into the vehicle compartment R (hereafter referred to as the "blowout temperature").

Figure 2:
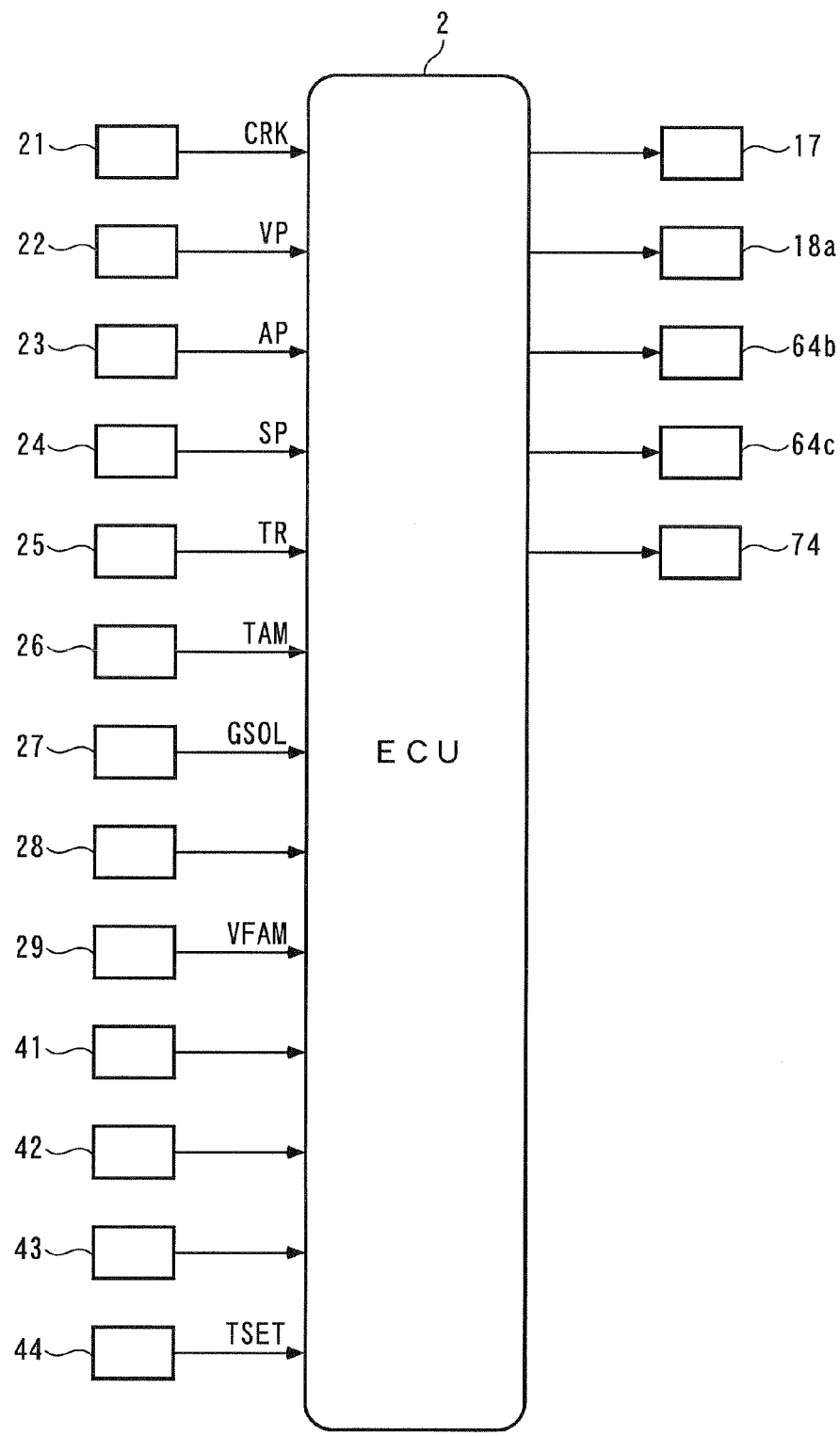
FIG. 2 is a block diagram of the stop control system.

Further, a pivotally-movable intake door 62 is disposed at the inlet of the air conditioner casing 61. This intake door 62 is for switching between inside air introduction for introducing air from the vehicle compartment R into the air conditioner casing 61 and outside air introduction for introducing outside air. The switching is performed using a switching lever (not shown) provided for the driver's seat. Furthermore, for the driver's seat, there is provided a compartment temperature-setting switch 44 (see FIG. 2) for a driver to set the temperature of the vehicle compartment R.

The crankshaft 3a of the engine 3 is provided with a crank angle sensor 21. The crank angle sensor 21 delivers a CRK signal, which is a pulse signal, to the ECU 2 along with rotation of the crankshaft 3a, whenever the crankshaft 3a rotates through a predetermined angle (e.g. 30°). The ECU 2 calculates a rotational speed NE of the engine 3 (hereafter referred to as the "engine speed NE") based on the CRK signal.

Further, delivered to the ECU 2 are a detection signal indicative of a vehicle speed VP, which is the speed of the vehicle V, from a vehicle speed sensor 22, a detection signal indicative of a degree AP of opening of an accelerator pedal (not shown) (hereafter referred to as the "accelerator pedal opening AP"), from an accelerator pedal opening sensor 23, and a detection signal indicative of one of shift positions (L, 2, D, N, R, and P) of a shift lever (not shown), from a shift position sensor 24.

Further, delivered to the ECU 2 are a detection signal indicative of a temperature TR of the vehicle compartment R (hereafter referred to as the "compartment temperature TR") from a compartment temperature sensor 25, a detection signal indicative of a temperature TAM of outside air (hereafter referred to as the "outside air temperature TAM") from an outside air temperature sensor 26, and a detection signal indicative of an amount GSOL of solar radiation (hereafter referred to as the "solar radiation amount GSOL") from a solar radiation sensor 27.

Furthermore, detection signals indicative of current and voltage input to and output from a battery 5, which is a power source of a starter 4, are delivered to the ECU 2 from a current-voltage sensor 28. The ECU 2 calculates a remaining charge SOC of the battery 5 (hereafter referred to as the "battery remaining charge SOC") based on the detection signals. Further, a detection signal indicative of the fan voltage VFAN is delivered to the ECU 2 from a fan voltage sensor 29.

Further, a detection signal indicative of an on/off state of an ignition switch 42 is delivered from the ignition switch 42 to the ECU 2. Note that when the ignition switch 42 is turned on during stoppage of the engine 3, the starter 4 connected to the crankshaft 3a is operated, whereby the engine 3 is cranked and started. Further, when the ignition switch 42 is turned off during operation of the engine 3, the engine 3 is stopped.

Furthermore, delivered to the ECU 2 are a detection signal indicative of an on/off state of a brake pedal (not shown) from a brake switch 43, and a detection signal indicative of a set room temperature TSET set for the vehicle compartment R from the compartment temperature-setting switch 44.

Further, the ECU 2 is implemented by a microcomputer (not shown) comprising a CPU, a RAM, a ROM, and an input interface (none of which are shown). The ECU 2 performs various computing operations based on the detection signals from the aforementioned sensors 21 to 29 and switches 41 to 44 according to control programs stored in the ROM. Note that in the present embodiment, the ECU 2 corresponds to target blowout temperature-setting means and restart means.

Next, a stop control process of the engine 3 executed by the ECU 2 will be described with reference to FIGS. 3 to 6. Note that processes described hereafter are executed whenever a predetermined time period elapses.

Figure 3:
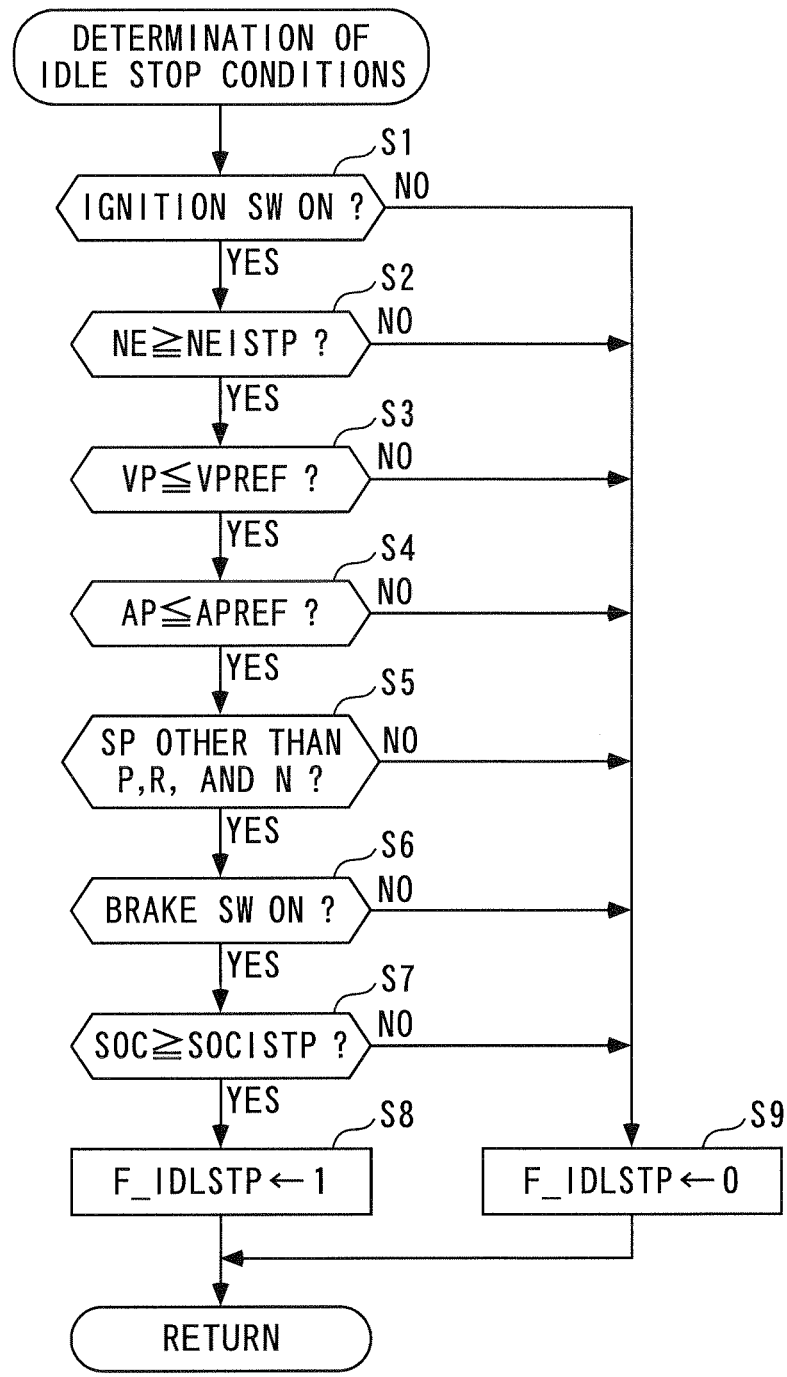
FIG. 3 is a flowchart of a process for determining whether or not idle stop conditions are satisfied.

FIG. 3 shows a process for determining whether or not idle stop conditions are satisfied. In the present process, in steps 1 to 7, it is determined whether or not the following conditions (a) to (g) are satisfied, respectively.

(a) The ignition switch (SW) 42 is on.
(b) The engine speed NE is not lower than a predetermined value NEISTP.
(c) The vehicle speed VP is not higher than a predetermined value VPREF.
(d) The accelerator pedal opening AP is not larger than a predetermined value APREF.
(e) The shift position (SP) is other than P, R, and N.
(f) The brake switch (SW) 43 is on.
(g) The battery remaining charge SOC is not lower than a predetermined value SOCISTP.

If all of these conditions (a) to (g) are satisfied, it is determined that the idle stop conditions are satisfied, and to indicate the fact, in a step 8, an idle stop flag F_IDLSTP is set to 1, followed by terminating the present process. When the idle stop flag F_IDLSTP is set to 1 during operation of the engine 3, an idle stop for automatically stopping the engine 3 is executed.

On the other hand, if any of the answers to the respective questions of the steps 1 to 7, is negative (NO), i.e. if any of the conditions (a) to (g) is not satisfied, it is determined that the idle stop conditions are not satisfied, and to indicate the fact, in a step 9, the idle stop flag F_IDLSTP is set to 0, followed by terminating the present process. When the idle stop flag F_IDLSTP is set to 0 during the idle stop, the idle stop is terminated, followed by restarting the engine 3.

Figure 4:
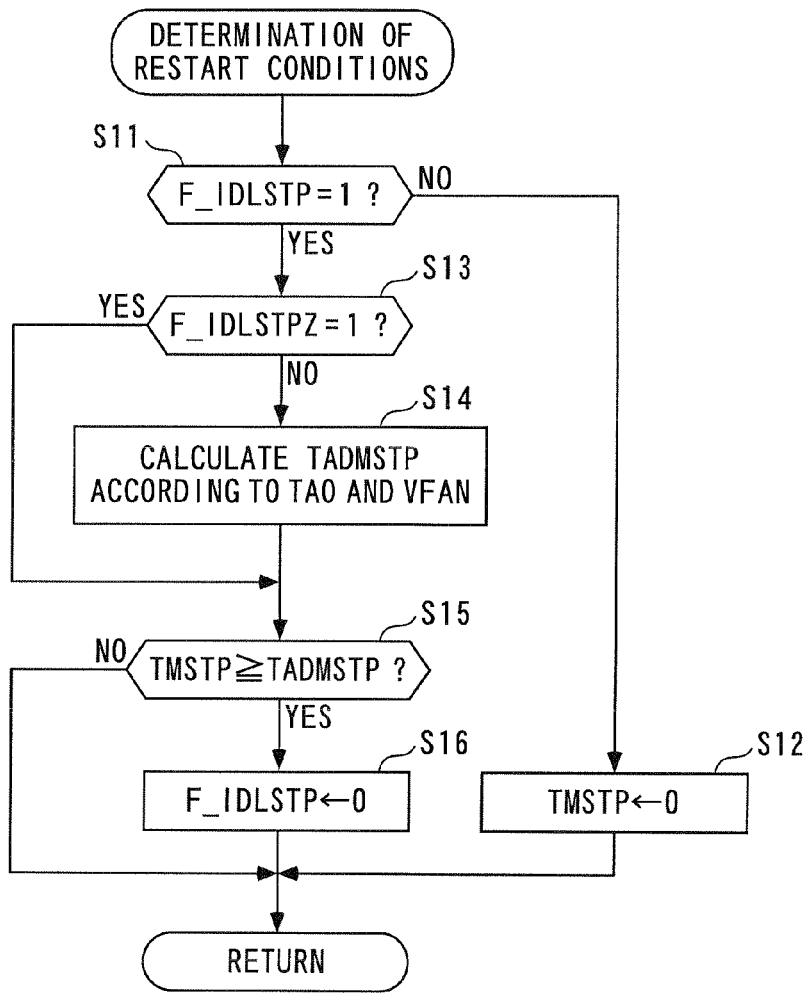
FIG. 4 is a flowchart of a process for determining whether or not restart conditions are satisfied.

FIG. 4 shows a process for determining whether or not restart conditions are satisfied, according to the present embodiment. The present process is for determining whether or not the restart conditions for restarting the engine 3 are satisfied, according to a state of the blowout temperature of air blown out into the vehicle compartment R during the idle stop.

In the present process, first, in a step 11, it is determined whether or not the idle stop flag F_IDLSTP is equal to 1. If the answer to this question is negative (NO), i.e. if the idle stop is not being executed, a value TMSTP of a stoppage time period-counting timer of an up count type which is for automatically counting a stoppage time period during which the engine 3 remains stopped by the idle stop (hereafter referred to as the "stoppage time period-counting timer value TMSTP"), is reset to 0 (step 12), followed by terminating the present process.

If the answer to the question of the step 11 is affirmative (YES), i.e. if the idle stop is being executed, it is determined whether or not an immediately preceding value F_IDLSTPZ of the idle stop flag is equal to 1 (step 13). If the answer to this question is negative (NO), i.e. if the present loop corresponds to a loop immediately after the start of the idle stop, a stop allowable time period TADMSTP, which is a time period over which the idle stop is allowable, is calculated by searching a map shown in FIG. 6 according to the target blowout temperature TAO and the fan voltage VFAN currently detected (step 14), and then the process proceeds to a step 15, referred to hereinafter.

Figure 5:
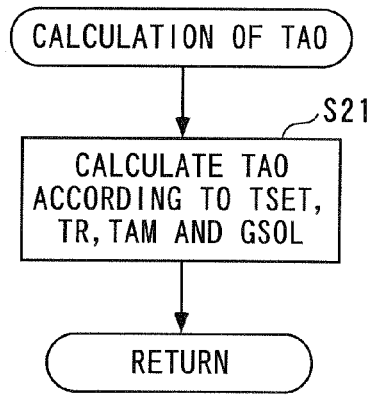
FIG. 5 is a flowchart of a process for calculating a target blowout temperature.

The above-mentioned target blowout temperature TAO serves as a target value of the blowout temperature of air blown out into the vehicle compartment R, and as shown in FIG. 5, is calculated and set by searching a predetermined map (not shown) according to the set room temperature TSET, the compartment temperature TR, the outside air temperature TAM, and the solar radiation amount GSOL (step 21). According to the target blowout temperature TAO thus set, the engagement and disengagement of the above-described air conditioner clutch 17, the air volume blown by the fan 18, and the respective degrees of opening of the vent door 64b, the floor door 64c, and the air mix door 74 are set and controlled by the ECU 2, whereby the blowout temperature is controlled to the target blowout temperature TAO.

In the FIG. 6 map, m×n stop allowable time periods TADMSTP are set for combinations of each of m predetermined values (TAO1 to TAOm) of the target blowout temperature TAO and each of n predetermined values (VFAN1 to VFANn) of the fan voltage VFAN, respectively. When the target blowout temperature TAO and/or the fan voltage VFAN are/is not equal to any of the predetermined values, the stop allowable time period TADMSTP is calculated by interpolation.

Further, in this map, the stop allowable time period TADMSTP is set to a smaller value as the target blowout temperature TAO is further away from a predetermined reference temperature (e.g. 25° C.) corresponding to a temperature for which the air conditioner 10 is normally used. This is because it is estimated that the degree of a cooling or heating demand from the driver is higher as the target blowout temperature TAO is further away from the reference temperature.

Furthermore, the stop allowable time period TADMSTP is set to a smaller value as the fan voltage VFAN is higher. This is because as the fan voltage VFAN is higher, the air volume blown by the fan 18 is larger, and when the air conditioner is performing cooling operation, the amount of heat accumulated in the evaporator 15 before the engine 3 is stopped is used up in a shorter time period whereby the blowout temperature of air blown out into the vehicle compartment R rises more quickly, whereas when the air conditioner is performing heating operation, the amount of heat accumulated in the heater core 71 is used up in a shorter time period, whereby the blowout temperature of air blown out into the vehicle compartment R lowers more quickly.

Further, if the answer to the question of the step 13 is affirmative (YES), i.e. if the present loop is not immediately after the start of the idle stop, the process skips over the step 14 to the step 15. In the step 15, it is determined whether or not the stoppage time period-counting timer value TMSTP reset in the step 12 is not shorter than the stop allowable time period TADMSTP.

If the answer to the question of the step 15 is negative (NO), i.e. if the stoppage time period during which the engine 3 remains stopped has not reached the stop allowable time period TADMSTP, it is determined that the restart conditions for restarting the engine 3 are not satisfied, and the process is immediately terminated to continue the idle stop.

On the other hand, if the answer to the question of the step 15 is affirmative (YES), i.e. if the stoppage time period during which the engine 3 remains stopped has reached the stop allowable time period TADMSTP, it is determined that the restart conditions for restarting the engine 3 are satisfied, and to restart the engine 3, the idle stop flag F_IDLSTP is set to 0 (step 16), followed by terminating the present process.

As described above, according to the present embodiment, immediately after the start of the idle stop, the stop allowable time period TADMSTP is calculated according to the target blowout temperature TAO, which is the target value of the blowout temperature of air blown out into the vehicle compartment R, and the fan voltage VFAN, which is an air volume parameter indicative of the air volume blown by the fan 18, and the engine 3 is restarted when the stoppage time period during which the engine 3 remains stopped (stoppage time period-counting timer value TMSTP) has reached the stop allowable time period TADMSTP. Therefore, during the idle stop of the engine 3, it is possible to start the restart of the engine 3 in proper timing while ensuring a blowout temperature appropriate to the target blowout temperature TAO and maintaining the compartment temperature TR. This makes it possible to ensure the comfort of vehicle occupants in the vehicle compartment R and improve the fuel economy of the engine during both the cooling operation and the heating operation of the air conditioner 10.

Further, the stop allowable time period TADMSTP is set to a smaller value as the target blowout temperature TAO is further away from the predetermined reference temperature corresponding to the temperature for which the air conditioner 10 is normally used, and hence it is possible to properly set the stop allowable time period TADMSTP according to the degree of a cooling or heating demand from the driver, and start the restart of the engine 3 in more appropriate timing.

Note that the present invention is by no means limited to the embodiment described above, but can be practiced in various forms. For example, although in the above-described embodiment, the fan voltage VFAN is used as the air volume parameter for calculating the stop allowable time period TADMSTP, this is not limitative, but there may be used another suitable parameter indicative of the air volume blown by the fan 18. For example, the air volume blown by the fan 18 may be directly detected using an air flow sensor or the like.

Further, although in the above-described embodiment, the present invention is applied to the air conditioner of a type that automatically controls the engagement and disengagement of the air conditioner clutch 17, the air volume blown by the fan 18, and the degree of opening of the air mix door 74, and so forth, according to the set room temperature TSET and temperature environments inside and outside the vehicle compartment R, by way of example, this is not limitative, but it is to be understood that the present invention may be applied to a manual-type air conditioner in which the driver sets the above-mentioned control parameters.

Furthermore, although in the above-described embodiment, the present invention is applied to the gasoline engine installed on a vehicle, this is not limitative, but it can be applied to various engines other than the gasoline engine, e.g. a diesel engine, and further, it can be applied to engines other than the engines for a vehicle, e.g. engines for ship propulsion machines, such as an outboard motor having a vertically-disposed crankshaft. Further, it is possible to change details of the construction of the embodiment within the spirit and scope of the present invention.

It is further understood by those skilled in the art that the foregoing are preferred embodiments of the invention, and that various changes and modifications may be made without departing from the spirit and scope thereof.

What is claimed is:

1. A stop control system for an internal combustion engine that is installed on a vehicle and is used as a drive source of a compressor for compressing refrigerant of an air conditioner and supplying the refrigerant to an evaporator, and as a heat source of the air conditioner, the stop control system stopping the engine when predetermined stop conditions are satisfied and restarting the engine when predetermined restart conditions are satisfied, wherein blowout of air from the air conditioner into a vehicle compartment is executed by operation of a fan of the air conditioner when the engine is stopped, comprising;
   target blowout temperature-setting means for setting a target blowout temperature which is a target value of a temperature of air blown out from the air conditioner into the vehicle compartment when the engine is stopped;
   air volume parameter acquisition means for acquiring an air volume parameter indicative of an air volume blown by a fan of the air conditioner when the engine is stopped; and
   restart means for calculating a stop allowable time period based on the set target blowout temperature and the acquired air volume parameter, and restarting the engine when a stoppage time period during which the engine remains stopped has reached the stop allowable time period,
   wherein the stop allowable time period is set to a smaller value as the target blowout temperature is lower than a predetermined reference temperature corresponding to a temperature for which the air conditioner is normally used, and to a smaller value as the target blowout temperature is higher than the predetermined reference temperature.

2. The stop control system according to claim 1, wherein the stop allowable time period is set to a smaller value as the air volume parameter is larger.

3. The stop control system according to claim 1, wherein blowout of air from the air conditioner into the vehicle compartment is executed by operation of the fan of the air conditioner when the engine is stopped to allow for heat transfer between the air conditioner and the air blown out from the air conditioner into the vehicle compartment when the engine is stopped.

4. The stop control system according to claim 1, wherein the stop allowable time period is set to ensure the tempera re of the air blown out from the air conditioner into the vehicle compartment is appropriate to maintain a temperature of the vehicle compartment during the stop allowable time period while the engine is stopped.

5. A stop control system for an internal combustion engine that is installed on a vehicle and is used as a drive source of a compressor for compressing refrigerant of an air conditioner and supplying the refrigerant to an evaporator, and as a heat source of the air conditioner, the stop control system stopping the engine when predetermined stop conditions are satisfied and restarting the engine when predetermined restart conditions are satisfied, wherein blowout of air from the air conditioner into a vehicle compartment is executed by operation of a fan of the air conditioner when the engine is stopped, comprising:
   a control unit configured to set a target blowout temperature which is a target value of a temperature of air blown out from the air conditioner into a vehicle compartment when the engine is stopped,
   wherein the control unit is further configured to acquire an air volume parameter indicative of an air volume blown by a fan of the air conditioner when the engine is stopped,
   wherein the control unit is further configured to calculate a stop allowable time period based on the set target blowout temperature and the acquired air volume parameter, and restart the engine when a stoppage time period during which the engine remains stopped has reached the stop allowable time period, and
   wherein the stop allowable time period is set to a smaller value as the target blowout temperature is lower than a predetermined reference temperature corresponding to a temperature for which the air conditioner is normally used, and to a smaller value as target blowout temperature is higher than the predetermined reference temperature.

6. The stop control system according to claim 5, wherein the stop allowable time period is set to a smaller value as the air volume parameter is larger.

7. The stop control system according to claim 5, wherein blowout of air from the air conditioner into the vehicle compartment is executed by operation of the fan of the air conditioner when the engine is stopped to allow for heat transfer between the air conditioner and the air blown out from the air conditioner into the vehicle compartment when the engine is stopped.

8. The stop control system according to claim 5, wherein the stop allowable time period is set to ensure the temperature of the air blown out from the air conditioner into the vehicle compartment is appropriate to maintain a temperature of the vehicle compartment during the stop allowable time period, while the engine is stopped.

* * * * *